United States Patent

[11] 3,588,504

| [72] | Inventors | Brian John Russell Laundy<br>Abingdon;<br>William Horton Hardwick, Oxford,<br>England |
|---|---|---|
| [21] | Appl. No. | 758,332 |
| [22] | Filed | Sept. 9, 1968 |
| [45] | Patented | June 28, 1971 |
| [73] | Assignee | United Kingdom Atomic Energy Authority<br>London, England |
| [32] | Priority | Sept. 12, 1967 |
| [33] |  | Great Britain |
| [31] |  | 41664/67 |

[54] APPARATUS FOR PARTICLE SIZE ANALYSIS UTILIZING BETA BACKSCATTERING
5 Claims, 2 Drawing Figs.

[52] U.S. Cl............................................ 250/71.5,
73/61.4, 250/43.5, 250/83.3

[51] Int. Cl........................................... G01n 23/22,
G01t 1/20
[50] Field of Search.................................... 250/71.5,
43.5 (D), 83.3 (D); 73/61.4, 432 (PS)

[56] References Cited
UNITED STATES PATENTS

| 3,009,388 | 11/1961 | Polanyi........................ | 73/61.4 |
| 3,210,545 | 10/1965 | Barnett........................ | 250/83.3D |
| 3,449,567 | 6/1969 | Olivier et al. ................. | 250/43.5D |

*Primary Examiner*—Walter Stolwein
*Assistant Examiner*—Morton J. Frome
*Attorney*—Larson and Taylor ABSTRACT: Particle size analysis apparatus is provided for fitting into a centrifuge. It comprises a sedimentation tube, a beta particle source and beta particle detection means. The detector can be an annular plastic scintillator coupled to a photomultiplier.

PATENTED JUN28 1971          3,588,504

APPARATUS FOR PARTICLE SIZE ANALYSIS UTILIZING BETA BACKSCATTERING

BACKGROUND OF THE INVENTION

The present invention relates to particle size analysis and particularly to analysis using beta particle backscattering.

It is a known technique to effect a particle size analysis by forming a suspension of the particles in a suitable liquid and allowing them to settle under gravity. The rate of fall through a given liquid of any given particle depends on its diameter in accordance with Stokes law. In one convenient arrangement the size distribution of a powder consisting of particles of differing sizes each having a different rate of fall is determined by measuring the buildup of a sediment using a beta particle backscattering technique. Unfortunately this technique cannot be used on very small particles, of the order of 1 micron or less, as the rate of settling is extremely low and, in the limit, no settlement takes place.

It is an object of the present invention to provide a new or improved process and apparatus for particle size analysis which can be used on smaller particles.

SUMMARY OF THE INVENTION

According to the present invention, there is provided a process for particle size analysis which comprises forming a suspension of the particles in a fluid of suitable viscosity, effecting centrifugal separation of the suspension and, during such separation, continuously measuring the buildup of a sediment using beta particle backscattering from such sediment.

According to a further aspect of the present invention, there is provided apparatus for particle size analysis comprising, for mounting in a centrifuge, a sedimentation tube, means positioning a source of beta particles adjacent the base of such tube and beta particle detection means positioned adjacent the track of said tube to receive beta particles backscattered from the sediment in such tube.

Although the beta particle detection means may comprise an annular ionization chamber, it preferably comprises an annular plastic scintillator which also functions as a light guide, coupled with a photomultiplier. Conventional counting and print out devices are also provided.

BRIEF DESCRIPTION OF THE DRAWINGS

In order that the present invention may more readily be understood, one embodiment of the same will now be described with reference to the accompanying drawings, wherein.

DESCRIPTION OF THE PREFERRED EMBODIMENT

Figure 1:
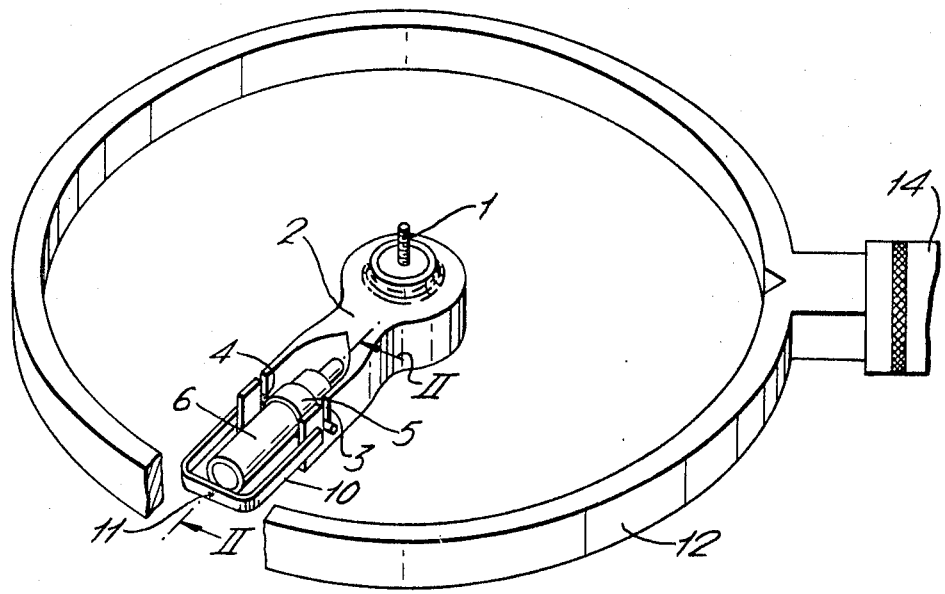
FIG. 1 is a diagrammatic perspective view of the apparatus.

In the drawings, the centrifuge bowl is not illustrated but the central spindle is shown at 1 and the centrifuge arm mounted thereon is shown at 2. As will be seen from FIG. 1 in particular, this arm is of the type having a pair of slots 3 to receive cross pins 4 on a collar 5 surrounding a support tube 6. As may be more readily seen in FIG. 2, this support tube 6 has its free or outer end turned inwardly to form a lip 7 which by virtue of the location of the cross pins 4 will be at a lower end of the support tube 6 when the centrifuge is not operative and which will therefore be at the outer end of the support tube when the arm 2 is rotated.

Figure 2:
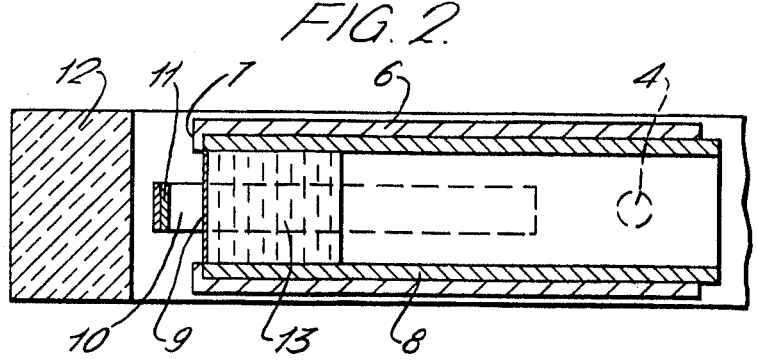
FIG. 2 is a section, drawn to an enlarged scale, on the line II-II of FIG. 1.

This flange 7 supports a sedimentation tube 8 which has a thin window 9 at its lower end. This window 9 may, for example, be made of beryllium. A stirrup 10 is carried by the end of the arm 2 in such a position as to embrace the support tube 6 when this is swung out as shown in FIG. 1. The inner side of the base of the stirrup 10 supports a beta particle source 11 which may conveniently be a strontium-90 source. An annular plastic scintillator 12 surrounds the track of the centrifuge arm in such a way that beta particles backscattered by s suspension 13 within the sedimentation tube (and passing through the beryllium window 9) are received by the scintillator 12. This scintillator is coupled in a known fashion to a photomultiplier 14.

Although the detection efficiency for backscattered beta particles varies somewhat around the annulus of the scintillator 12, this is not very relevant as the mean efficiency can be used. It will be appreciated that the centrifuge arm rotates at an extremely high speed so that the small fluctuations in sensitivity are completely masked. As is conventional, the photomultiplier is coupled to a counting and print out device and it is possible to follow the buildup in the base of the sedimentation tube 8 whilst the centrifuge is in operation. In this way it is possible to follow the settling of a suspension of extremely fine particles, for example, down to 0.1 micron.

We claim:

1. Apparatus for particle size analysis comprising, for mounting in a centrifuge, a sedimentation tube, means for positioning a source of beta particles adjacent the base of said tube and beta particle detection means positioned adjacent the track of said tube to receive beta particles backscattered from the sediment in said tube.

2. Apparatus as claimed in claim 1, wherein said beta particle detection means comprises an annular plastic scintillator.

3. Apparatus as claimed in claim 2, wherein is provided a photomultiplier and the scintillator also functions as a light guide and is coupled to such photomultiplier.

4. Apparatus as claimed in claim 1, wherein the said means for positioning the source of beta particles comprises a stirrup carried by a rotatable arm of said centrifuge, such stirrup surrounding the sedimentation tube when the said arm is rotating.

5. Apparatus as claimed in claim 1, wherein the said source is a strontium-90 source.